Patented Sept. 14, 1937

2,092,971

UNITED STATES PATENT OFFICE 2,092,971

YELLOW AZO DYESTUFF

Bernard Herstein, Brooklyn, N. Y., assignor to U. S. Industrial Alcohol Co., New York, N. Y., a corporation of West Virginia No Drawing. Application November 18, 1935, Serial No. 50,367. Renewed May 17, 1937

1 Claim. (Cl. 260—86)

In my copending application, Serial No. 46,123, filed October 22, 1935, I have described and claimed a convenient and economic method for producing ortho nitro para tertiary butyl aniline. This product lends itself very readily to the preparation of an azo dyestuff of the so-called "Hansa Yellow" group of the following formula:

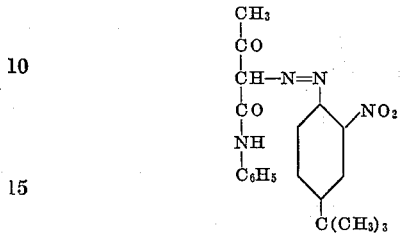

This compound hitherto unknown to industry, besides its pure and intensely yellow color and great fastness to light, is characterized by its marked solubility in alcohol and appreciable solubility in oil, which is a valuable advantage for some purposes.

To prepare the dyestuff one mol. of the ortho nitro para tertiary butyl aniline is diazotized in the regular manner and the diazotized solution is coupled in the cold with one mol. of acetoacetanilid dissolved in an equivalent of sodium hydroxid of sufficient concentration. As is usual in reactions of this character sodium acetate is added while coupling in order to soften or eliminate the effect of the mineral acid used in diazotization.

The yellow dyestuff thus obtained after filtering, washing and drying has a melting point of about 180° C., is insoluble in water, markedly soluble in alcohol, and appreciably soluble in oil, for instance vegetable oil.

I claim:

The herein described yellow dyestuff of the formula:

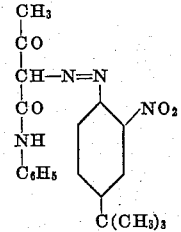

having a melting point of about 180° C., possessing great fastness to light, and being insoluble in water, markedly soluble in alcohol and appreciably soluble in oil.

BERNARD HERSTEIN.